United States Patent [19]

Nagaoka

[11] 3,861,689

[45] Jan. 21, 1975

[54] AUTOMATIC RECORDING MEDIUM CHANGING DEVICE

[75] Inventor: Tadashi Nagaoka, Nishinomiya, Japan

[73] Assignee: Matsushita Electric Industrial Co., Ltd., Osaka, Japan

[22] Filed: Jan. 9, 1973

[21] Appl. No.: 322,215

[30] Foreign Application Priority Data

Jan. 20, 1972 Japan .................................. 47-7975

[52] U.S. Cl. ................................................ 274/10 R
[51] Int. Cl. ............................................ G11b 17/12
[58] Field of Search ......................... 274/10 R, 10 E

[56] References Cited

UNITED STATES PATENTS

| | | | |
|---|---|---|---|
| 1,802,830 | 4/1931 | Pittman | 274/10 E |
| 1,802,831 | 4/1931 | Pittman | 274/10 E |
| 3,048,385 | 3/1972 | Barlow | 274/10 E |
| 3,767,848 | 10/1973 | Schuller | 274/4 H |

*Primary Examiner*—Harry N. Haroian
*Attorney, Agent, or Firm*—Stevens, Davis, Miller & Mosher

[57] ABSTRACT

An automatic recording medium changing device is described in which guide means are interposed between storage means for storing therein a plurality of disk-shaped flexible recording media in the stacked form and means for rotating the recording medium for recording or reproduction and between said recording medium rotating means and said storage means or another storage means; and means is provided for transporting the lowermost recording medium in said storage means along said guide means toward said recording medium rotating means and also for transporting the recording medium upon said rotating means which has been played or has had the signals recorded thereupon to said storage means or said separate storage means so that a plurality of recording media may be automatically changed aNd continuously played one by one.

4 Claims, 15 Drawing Figures

AUTOMATIC RECORDING MEDIUM CHANGING DEVICE

The present invention relates to an automatic recording medium changing device for use with a video or audio recording and reproducing system of the type in which disk-shaped flexible recording media are used for recording and reproduction.

In the automatic disk changing devices for phonographs, disks stacked on a stacker column are dropped one by one upon a turntable when the disk on the turntable has been played, and a pickup is advanced into the playback position. After the disk has been played, the pickup arm is retracted from the disk so as not to interfere with the disk to be dropped upon the turntable. The pickup arm is so designed and arranged that the pickup and hence its stylus may contact with the uppermost disk upon the turntable even though the height of the stack of disks on the turntable is increased.

In the automatic disk changing devices used in juke boxes, a plurality of disks are generally stored in vertical positions, and a selected disk is transported to the playback position by an arm or the like and is returned to the storage position after it has been played.

However the automatic disk changing devices of the type described both handle only disks having some rigidity. For example the ordinary disks are plastic disks about two milimeters in thickness. Therefore the automatic disk changing devices of the type described cannot handle a sheet-like flexible disk only 0.15 mm in thickness. Furthermore the automatic disk changing devices of the type described has a distinct defect in that the disk changing time is of relatively long duration.

There has been recently devised and demonstrated a video signal recording and reproducing system of the type using a very thin plastic disk about 0.1 mm in thickness and about 21 cm in diameter which is rotated at a very high speed such as 1,800 rpm. Since a very wide bandwidth is required for recording and reproducing video signals as compared with audio signals, the pitch of the groove is as small as about 7 microns, and the grooves are cut only to the midpoint between the center of the disk and a point at the periphery thereof. Therefore the recording or playback time is only about five minutes in case of a video disk with a diameter of 21 cm. Thus 12 video disks are required for recording or playing back the video information for one hour. Since the recording or playback time is extremely short compared to conventional recording means, it is of course desired that the disk changing time be minimized, but the disk changing devices of the type described cannot satisfy this requirement. Furthermore the video disks of the type described are very thin and susceptible to damages in handling so that is is preferable to store them in a cassette or the like so that they may be automatically and continuously played back, thus eliminating manual operation. Another problem encountered in the video disks of the type described is that since the pitch of the groove is as small as about 7 microns and the depth of the groove is accordingly as shallow as a few microns, it is extremely difficult to provide the optimum contact between the stylus of the pickup and the groove. To overcome this problem there has been devised and demonstrated a method in which only a small area close to the center of the disk is firmly held in position and the air flow is made to pass the narrow space between the undersurface of the disk and a stationary member so that the disk may be floated and cushioned. When this method is employed, the video disks cannot be stacked for automatic changing so that every time one disk has been played it must be removed from the turntable.

The video disk reproducing system requires a mechanism which may advance the pickup in a radial direction of the disk so that its stylus may precisely follow the groove. However it is extremely difficult to retract the pickup with such mechanism away from the disk at a very high speed when the disk is changed and to advance the pickup into the playback position with a high degree of accuracy. The conventional automatic disk chaing devices cannot overcome this problem.

One of the objects of the present invention is therefore to provide a novel automatic recording medium changing device capable of changing disk-shaped flexible recording media at a very high speed.

Another object of the present invention is to provide a novel automatic recording medium changing device which may transport one by one a plurality of disk-shaped flexible recording media stored in a cassette or the like to driving means such as a turntable for rotating a recording medium.

Another object of the present invention is to provide a novel automatic recording medium changing device which may automatically remove a disk-shaped flexible recording medium on the driving means and transport it into a storage case or the like after the disk has been played.

Another object of the present invention is to provide a novel automatic recording medium changing device which may transport one by one a plurality of disk-shaped flexible recording media stored in a cassette or the like toward driving means which rotates a recording medium while removing the recording medium on the driving means and transporting back into said cassette or the like after the recording medium has been played.

Briefly stated, an automatic recording medium changing device in accordance with the present invention generally comprises a storage case having an outlet opening formed along one side thereof for storing therein in stacked form a plurality of disk-shaped flexible recording media each provided with a center engaging hole, a turntable upon which the recording medium is rotated, means for engaging with the engaging hole of the recording medium so as to releasably hold it on said turntable, means for recording the signals on said recording medium on said turntable or reproducing the signals recorded on the recording medium on the turntable, guide means extending from the outlet opening of the storage case toward the turntable, and means for engaging with the lowermost recording medium in the storage case so as to transport the same through the outlet opening along the guide means toward the turntable.

The above and other objects, features and advantages of the present invention will become more apparent from the following description of the preferred embodiments thereof taken in conjunction with the accompanying drawing.

Figures 1, 2:
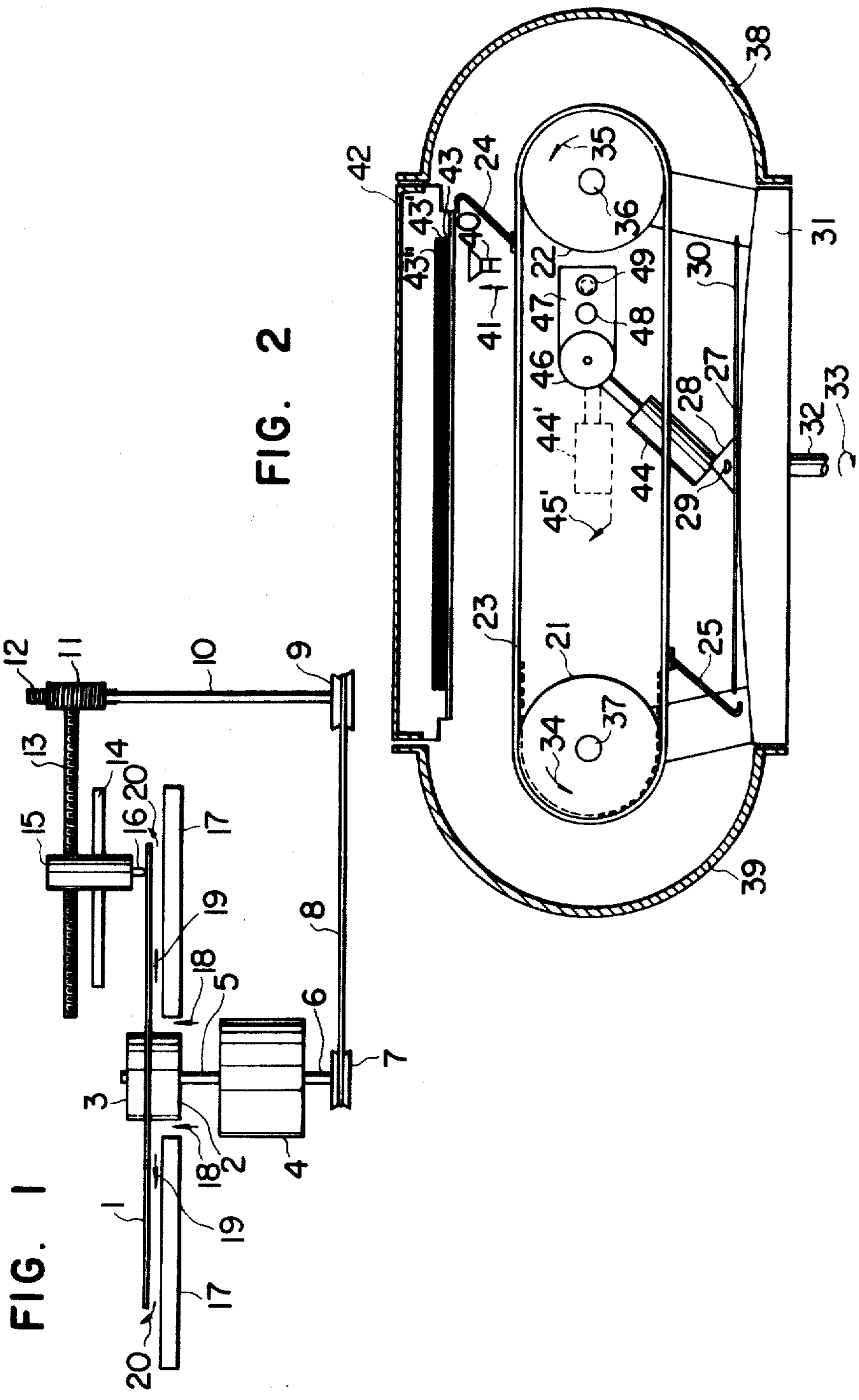
FIG. 1 is a schematic side view of one example of the conventional video disk players.
FIG. 2 is a side view, partly in section, of an automatic video disk changing device in accordance with the present invention.

Prior to the description of the preferred embodiments of the present invention, the prior art video disk player will be briefly described with reference to FIG. 1 so that the novel features of the present invention over the prior art may become more apparent. A video disk 1 is held in position on a turntable 2 with a holder 3 fitted over a spindle 5 coupled to an electric motor 4 so that the video disk 1 is rotated at 1,800 rpm. Air is made to flow through the narrow space between the video disk 1 and a base plate 17 in the direction indicated by arrows 18, 19, and 20 so that it may be floated and held in flat in conformity with the flat surface of the base plate 17 and in optimum contact with a stylus 16 of a pick-up 15 in playback. Therefore it is impossible for automatic continuous playback to stack or place the next video disk upon the video disk 1 when the latter has been played so that it must be removed.

Furthermore the pickup which is slidably mounted on a guide rod 14 is driven in the radial direction so as to precisely follow the groove of the video disk 1 by a lead thread 13 which in turn is rotated by a power transmission mechanism consisting of a worm wheel 1 in mesh with a worm 11 carried by a shaft 10 coupled to the motor 4 through a belt 8 wrapped around a pulley 9 carried by the shaft 10 and a pulley 7 carried by the driving shaft 6 of the motor 4. However the pickup feeding mechanism of this type must be so designed as to permit the pickup 15 to be retracted at a considerably high speed from the video disk when the latter is replaced with the next video disk and then to cause the pickup 15 to return to the initial position for playing the next disk. Therefore the pick-up feeding mechanism becomes inevitably complex in construction, and a sufficiently high degree of accuracy with which the stylus 16 of the pickup 15 follows the groove of the video disk 1 cannot be attained. The prior art automatic disk record changing mechanisms have been generally designed primarily for the rigid disks for audio reproduction not for the flexible disks for video reproduction. Therefore there has long been a need for an automatic video disk changing mechanism based upon a novel principle completely different from those of the prior art mechanism.

In brief, in an automatic disk changing mechanism in accordance with the present invention a video disk is loaded upon or unloaded from a player through an annular passage.

Referring to FIG. 2, an endless belt 23, which will be referred to as "a timing belt" in this specification, wrapped around toothed pulleys 21 and 22 carried by shaft 37 and 36, one of which is a driving shaft, is moved in the direction indicated by the arrows 34 and

35. The timing belt 23 is provided with two pairs of hooks 24 and 25 which are adapted to engage with a video disk so as to transport it to a turntable 27 and also so as to remove it from the turntable 27 and return it into a cassette 42. The timing belt 23 used in the instant embodiment ensure the precise synchronization of the transportation of a video disk and the movement of a pickup to be described hereinafter with the rotation of the driving shaft 36 or 37. Instead of the timing belt 23, a chain or the like may be used.

A video disk 30 which has been played or is to be played is held in position on the turntable 27 by means of a pair of retaining pawls 29 to be described hereinafter and is rotated upon a stationary base 31 at 1,800 rpm in the direction indicated by the arrow 33 as a spindle 32 rotates. Between the cassette 42 and the stationary base 31 are interposed curved guide plates 38 and 39 semi-circular in cross section so that a video disk may be transported along the walls of these curved plates for the desired effects to be described hereinafter. A plurality of video disks 43, 43', 43'', . . . are stacked in the cassette 42 in the order to be played from the lowermost disk 43. A suction cup 40 is so arranged as to reciprocate in the directions indicated by the double-pointed arrow 41 to facilitate the engagement of the pair of hooks 24 or 25 with the lowermost video disk 43 in the cassette 42.

A pickup 44 with a stylus 45' is pivoted with a pivot 46 to a carriage 47 so as to swing between the playback position indicated by the solid line 44 and the retracted position indicated by the broken lines 44'. The carriage 47 is slidably mounted on a guide rod 14' fitted into a thorough bore 48 and is advanced in the radial direction of the video disk 30 on the turntable 27 when the lead screw 13 screwed into an internally threaded bore 49 is rotated in synchronism with the rotation of the turntable 27 so that the sylus 45' may precisely follow the groove of the disk 30.

Next the general mode of the automatic disk changing operation will be described. When the video disk 30 has been played the pickup 44 is swung back to the retracted position 44' and the carriage 47 is quickly retracted to the initial position radially outwardly of the video disk 30. Then the suction cup 40 is raised through an aperture 42' formed in the cassette 42 to attach to the lowermost video disk 43 and is lowered to bring the disk 43 to the position where it may engage with the pair of hooks 24. When the timing belt 23 is moved, the pair of hooks 24 are brought into engagement with the video disk 43 so as to move the same and the suction cup 40 is released from the disk 43. Thus disk 43 is transported to left in FIG. 2. The other pair of hooks 25 engages with the disk 30 on the turntable 27 so as to transport it to right. In this case the pair of retaining pawls 29 are retracted into a cone 28 so that the disk 30 may freely ride over and past the cone 28 to the right. The disk 30 is transported along the curved inner wall of the guide plate 38 toward the cassette 42. The next disk 43 which is transported from the cassette 42 along the curved inner wall of the guide plate 39 toward the turntable 27 is correctly placed over the turntable 27 as the center hole of the disk is fitted over the cone 28 and is securely held in position by the pair of retaining pawls 29 extended from the cone 28. The diameter of the base of the cone 28 is equal to that of the center hole of a video disk. The above arrangement is very advantageous for high-speed disk changing because the video disk may move quickly toward the turntable 27 by its own energy released when the disk which was bent along the curved inner wall of the guide plate 39 is restored to its flat shape. Thus holding by the pair of hooks 24 is almost not required in this stage.

The video disk removed from the turntable 27 is also bent along the curved inner wall of the guide plate 38 and is inserted into the cassette 42 through an inlet opening thereof at a high speed and placed upon the uppermost video disk in the cassette 42. As soon as the next disk is placed in position on the turntable 27, the pickup 44 is advanced to the playback position to play the disk.

The above described automatic disk changing operation is cycled, and the continuous playback of the video disk is continued as long as desired.

Figure 3:
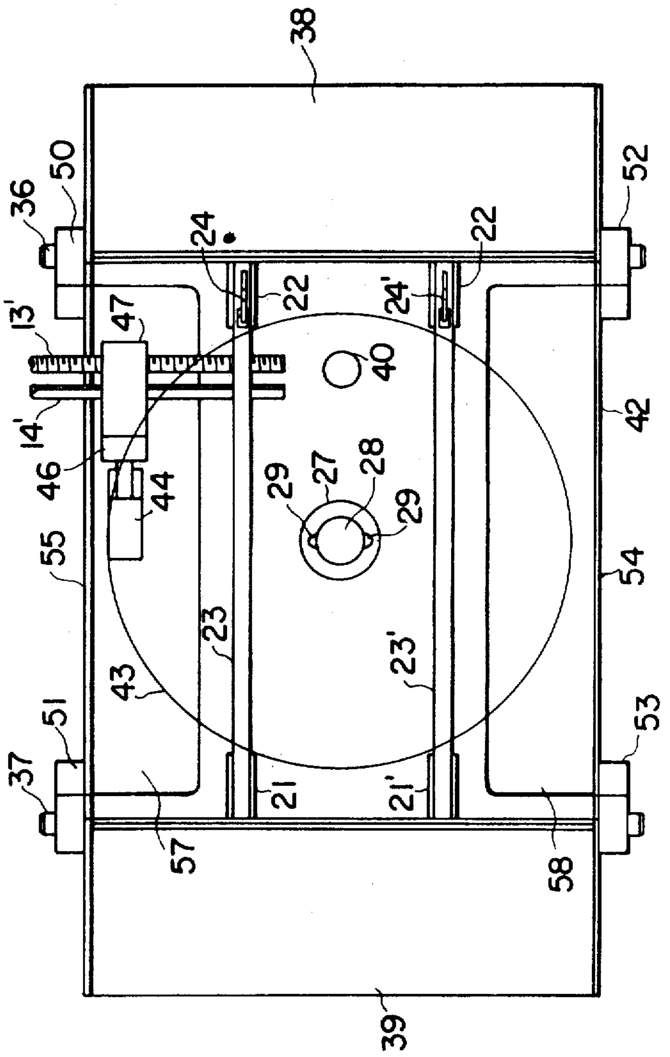
FIG. 3 is a top view thereof.

Next referring to FIG. 3 the side walls 54 and 55 of the cassette 42 are spaced apart from each other by a distance greater than the diameter of a video disk, and serve to prevent the video disk inserted into the cassette along the curved guide plate 38 from flying out of the cassette 42. In the instant embodiment, a pair of spaced apart timing belts 23 and 23' and two pairs of hooks 24 and 24' and 25 and 25' (the latter being not shown) are used, but only one timing belt 23 and only one pair of hooks 24 and 25 may be used.

In FIG. 3 the pickup 44 is in the playback position where its stylus 45' coincides exactly with the starting point of the groove of the video disk. The shafts 36 and 37 of the pulleys 22 and 21 are rotatably supported by pairs of supporting members 50 and 52, and 51 and 53, respectively. In the instant embodiment, the video disks 43 as well as the cassette 42 and the side walls 54 and 55 are made of a transparent material. The cassette 42 is provided with a pair of bottom members 57 and 58 spaced apart by a suitable distance so that the video disks 43 stacked thereupon may not fall through the space therebetween and that the pair of hooks 24 may pass through the cassette 42.

Next the mode of operation will be described in more detail hereinafter.

Figures 4, 5:
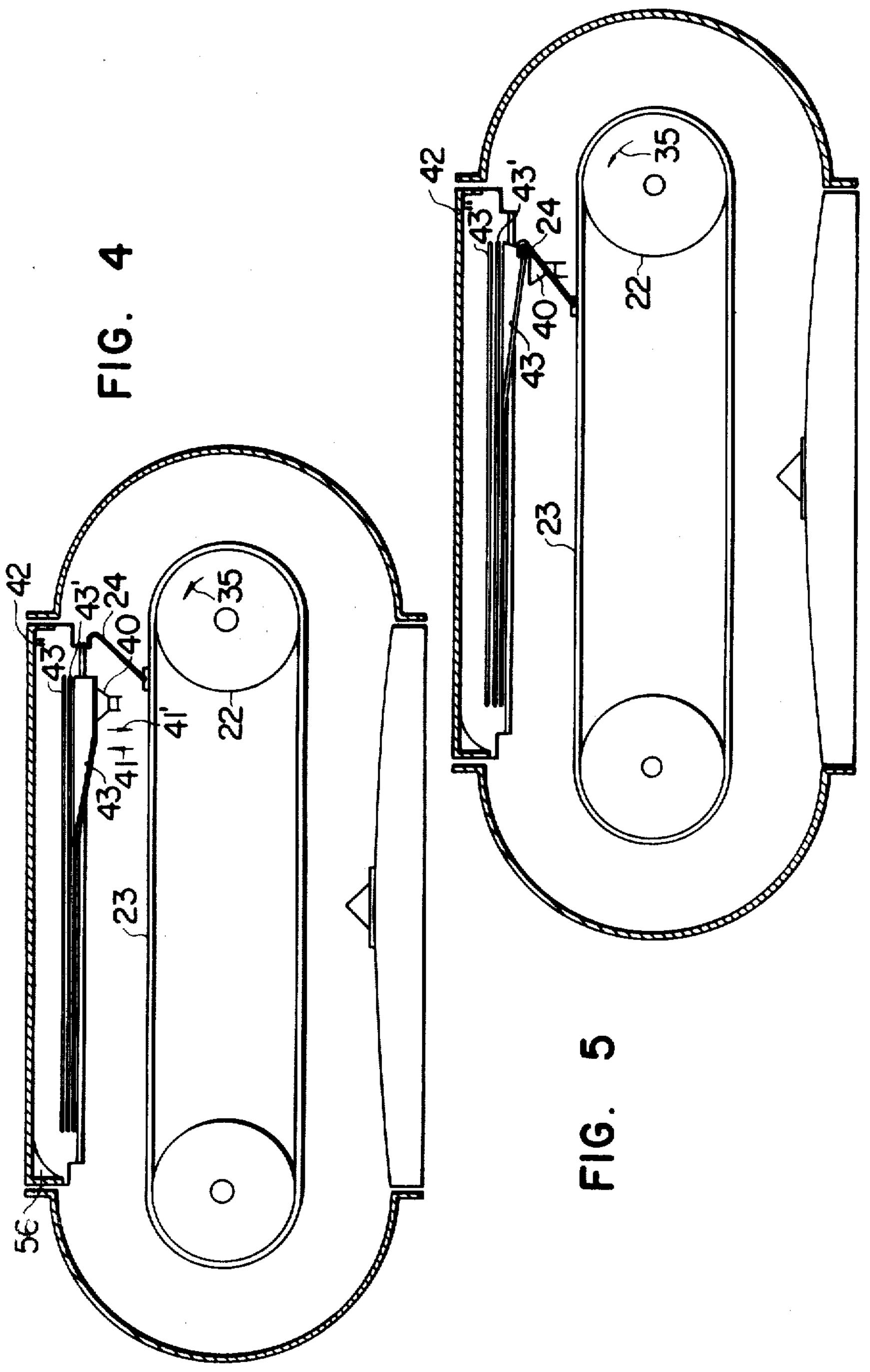
FIGS. 4 – 12 are side views used for the explanation of the mode of operation.

FIG. 4 shows a method for selecting the lowermost disk out of three disks 43, 43' and 43'' stored in the cassette 42. The suction cup 40 lowers the disk 43 in the direction indicated by the arrow 41'. Since the center of the bottom of the cassette 42 is opened as described hereinbefore, the section cup 40 may freely reach the disk so as to deform the same as shown in FIG. 4.

The suction cup 40 lowers the disk so that the latter may engage with the hook 24.

As the timing belt 23 is advanced the hook 24 is also displaced so as to engage with the disk as shown in FIG. 5.

In this case the suction cup 40 has been already released from the disk. For this purpose a valve may be opened after the suction cup 40 has been lowered.

Figure 6:
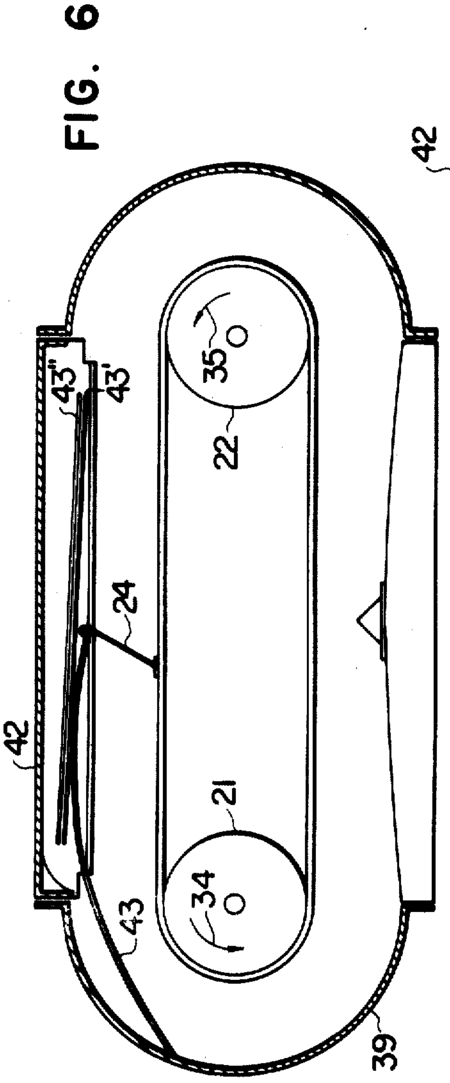

FIG. 6 shows that the leading edge of the disk 40 has passed beyond the opening of the cassette 40 as it is pushed to the left by the hook 24, and is now bent along the curved guide plate 39.

Figure 7:
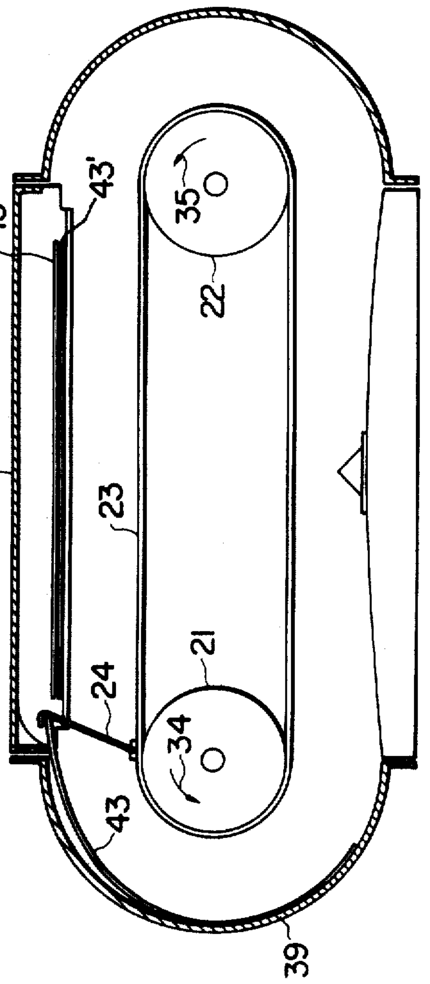

FIG. 7 shows that the disk 40 has been almost discharged out of the cassette 42 and is bent almost along the curved inner wall of the guide plate 39.

Figures 8, 9:
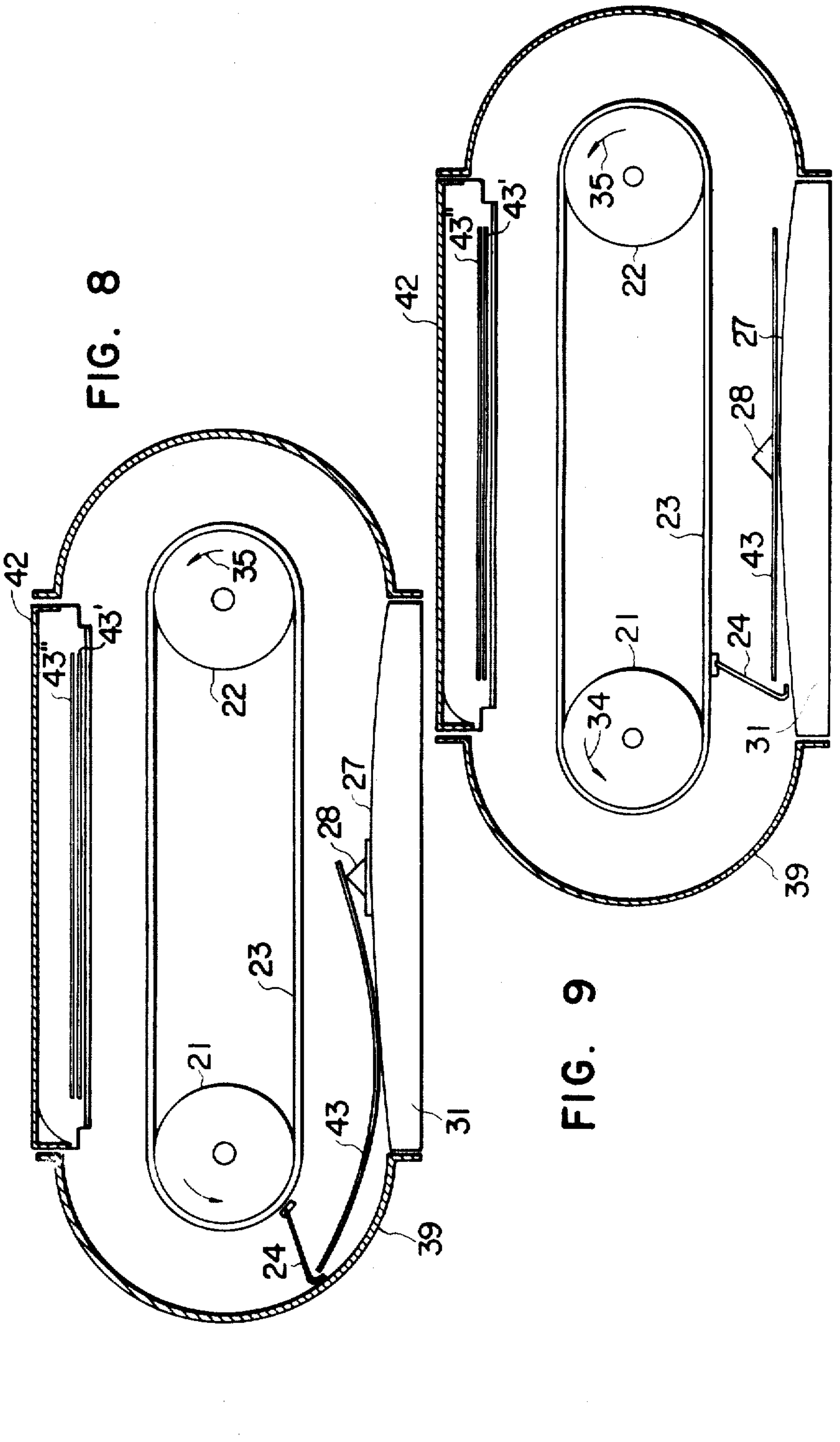

FIG. 8 shows that the disk 43 is further advanced so that the leading edge rides over the cone 28 while the rear edge is still on the curved inner wall of the guide plate 39.

FIG. 9 shows that the center hole of the disk is automatically fitted over the cone 28 and that the hook 24 slightly lags behind the trailing edge of the disk 43. The disk 43 must be securely held upon the turntable 27 as will be described hereinafter.

Figures 13, 14:
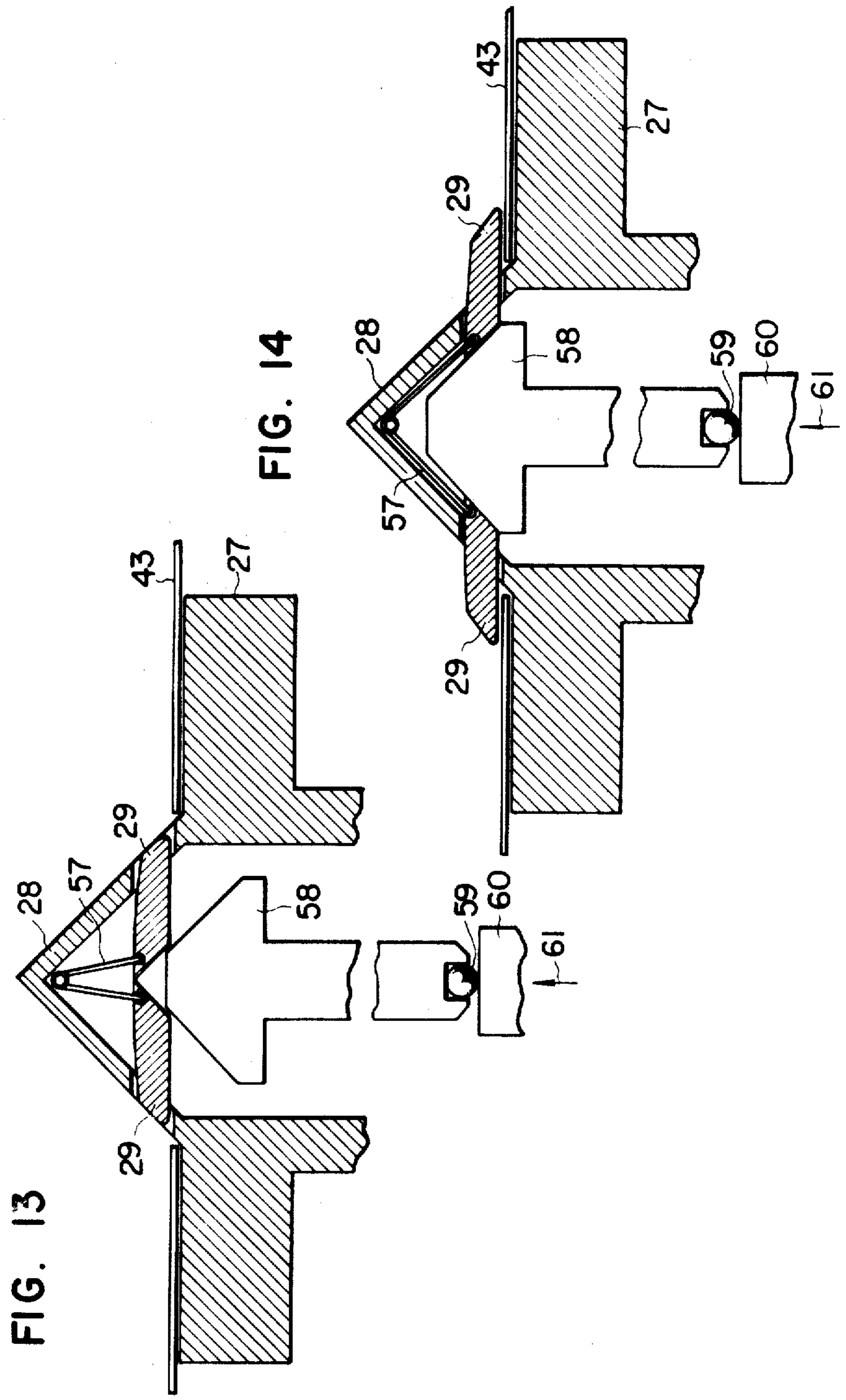
FIG. 13 is a fragmentary side view, on a large scale, illustrating a mechanism for holding a disk in position on a turntable, the disk being illustrated in releasable state.
FIG. 14 is a fragmentary side view similar to FIG. 13 but illustrates the disk being held on a turntable by the holding mechanism.

Referring to FIG. 13, a plurality of retaining pawls 29 are slidably disposed in the cone 28 and are normally retracted into the cone 28 under the force of a spring 57. An actuating rod 58 is disposed which is adapted to expand the pawls 29 against the spring 57. The spindle of the turntable 27 is disposed outwardly of this actuating rod 58 and is driven by a motor. A ball 59 is fitted into a center hole formed at the lower end of the actuating rod 58 and is in contact with the upper end of an actuating member 60 which lifts the actuating rod 58 so as to expand the pawls 29. The actuating rod 58 may rotate in unison with the turntable 27 but the actuating member 60 is held stationary because the ball 59 is interposed therebetween.

FIG. 14 shows that the actuating member 60 rises in the direction indicated by the arrow 61 so that the actuating rod 58 is lifted so that the pawls 29 are extended out of the cone 28 so as to securely hold the disk 43 in position on the turntable 27.

When the disk has been played and is to be removed, the actuating member 60 is lowered so that the actuating rod 58 is also lowered. Therefore the pawls 29 are automatically retracted into the cone 28 under the force of the spring 57.

Figures 10, 11:
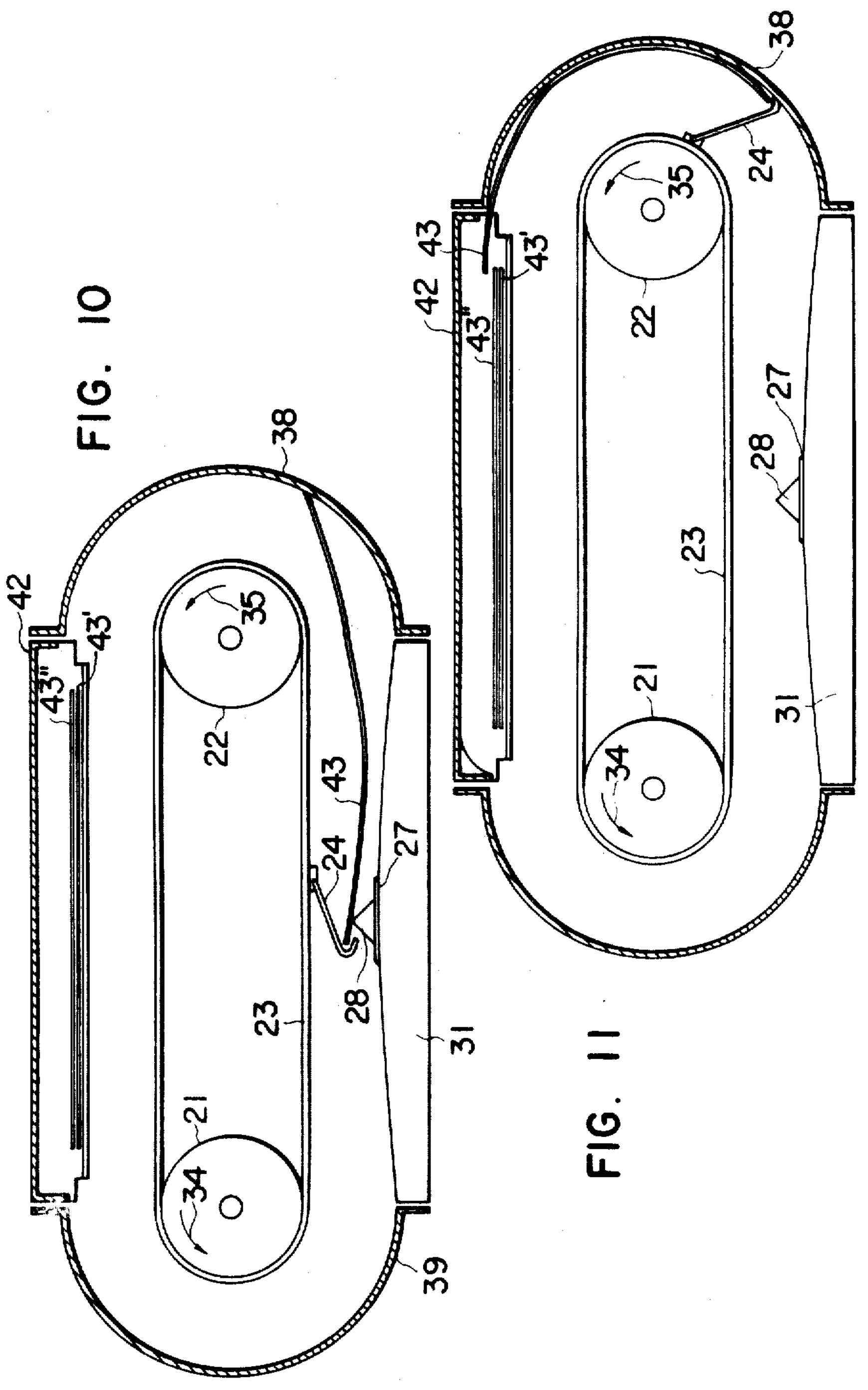
Figure 12:
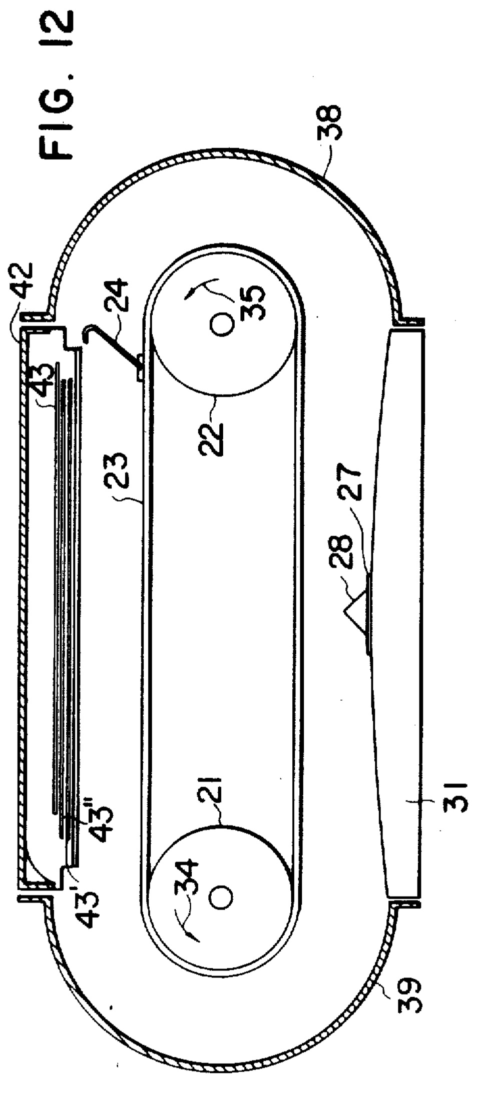

Thereafter the hook 24 in a position as shown in FIG. 9 is advanced again to engage with and transport the disk 43. Therefore the disk 43 rides over the cone 28 and the leading edge is bent along the curved guide plate 38 as shown in FIG. 10. The disk 43 is further transported along the curved guide plate 38 so that the leading edge is now inserted into the cassette 42 and is located above the uppermost disk 43'' as shown in FIG. 11. The disk 43 is finally placed over the disk 43'' as shown in FIG. 12.

The above described steps may be summarized as follows: In order to play a disk in the cassette, the disk is transported toward the turntable by the steps shown in FIGS. 4, 5, 6, 7, 8 and 9, and in order to automatically change the disks, the above steps are combined with the steps shown in FIGS. 9, 10, 11 and 12. Furthermore in order to stop playing and to remove the cassette, the steps shown in FIGS. 9, 10, 11 and 12 are used.

Figure 15:
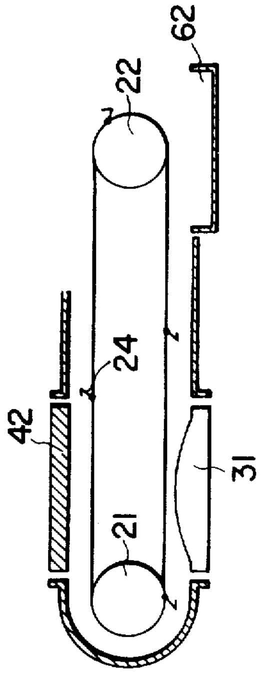
FIG. 15 is a side view, partly in section, of a second embodiment of the present invention.

In the first embodiment, the disks which have been played are returned again into the cassette 42, but in the second embodiment shown in FIG. 15, the disks which have been played are discharged into a separate storage case 62.

As described above according to the present invention the flexible audio and video disks may be automatically correctly placed upon the turntable and changed at a considerably high speed and the cassette loading of flexible disks and continuous playback thereof may become possible.

What is claimed is:

1. An automatic recording medium changing device comprising a. a storage case with an outlet opening formed along one side thereof for storing therein in stacked form a plurality of disk-shaped recording media each having a center engaging hole;

b. a turntable upon which said recording medium is rotated, said storage case being disposed immediately above said turntable and spaced therefrom by a suitable distance, said case being further provided with an inlet opening along the side thereof in opposed relation with said outlet opening;
c. means for engaging with said center engaging hole of said recording medium so as to releasably hold it in position upon said turntable;
d. means for recording the signals on said recording medium or reproducing the signals recorded on said recording medium upon said turntable;
e. first guide means extending from said outlet opening of said storage case to said turntable;
f. second guide means extending from said turntable toward said inlet opening of said storage case, said first and second guide means being defined by a curved wall bulging outwardly;
g. means for engaging with the lowermost recording medium in said storage case so as to transport the same through said outlet opening along said guide means toward said turntable, said recording medium transporting means comprising an endless belt disposed within a loop defined by said storage case, said first guide means, said turntable and said second guide means; and
h. hook means attached to said endless belt for engagement with the recording media in said storage case and upon said turntable.

2. An automatic recording medium changing device as set forth in claim 1 wherein said endless driving belt is provided with a plurality of said hook means.

3. An automatic recording medium changing device as set forth in claim 1 wherein the bottom of said storage case is provided with an elongated slot extending lengthwise from said inlet opening to said outlet opening so that said hook means pass through said elongated slot when said endless driving belt is driven.

4. An automatic recording medium changing device comprising a. a turntable upon which a disk-shaped recording medium having a center engaging hole is adapted to be located to rotate therewith;
b. means for engaging with said center engaging hole of the recording medium so as to releasably hold it in position upon said turntable;
c. means for recording signals on said recording medium or reproducing signals recorded on said recording medium upon said turntable;
d. a first storage case disposed immediately above said turntable for storing therein a plurality of said recording media, said first storage case being provided along one side thereof with an outlet through which one of said recording media is taken out and on the bottom thereof with an elongated slot extending lengthwise and connecting to said outlet;
e. a first guide plate defined by an outwardly curved wall extending from said outlet of the first storage case to said turntable;
f. a second storage case provided with an inlet through which said recording media is inserted to be stored therein;
g. a second guide plate extending from said turntable to said inlet of the second storage case;
h. an endless belt adapted to move along the inner periphery of a loop defined by said first storage case, said first guide plate, said turntable, said second guide plate and said second storage case; and
i. hook means provided on said endless belt so as to project through said slot into said first storage case for engagement with the lowermost recording medium in said first storage case to transport the same from said first storage case to said turntable along said first guide plate and for engagement with the recording medium upon said turntable to transport the same from said turntable to said second storage case along said second guide means.

* * * * *